Sept. 20, 1966    V. H. B. WILHITE    3,273,801
ROCKET ACCELERATION AND DIRECTION CONTROL BY FLUID INJECTION
Filed Aug. 30, 1962    2 Sheets-Sheet 1
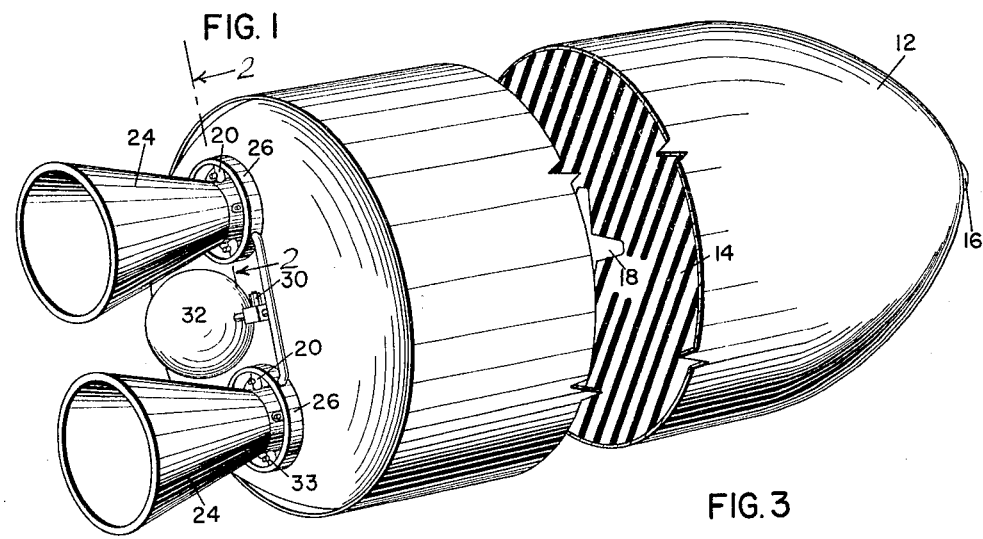
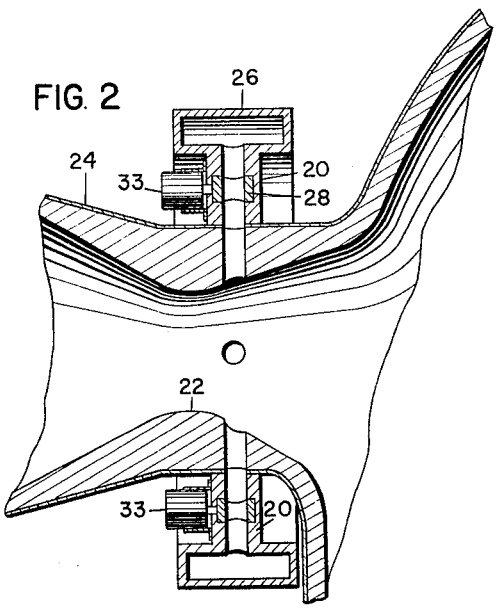
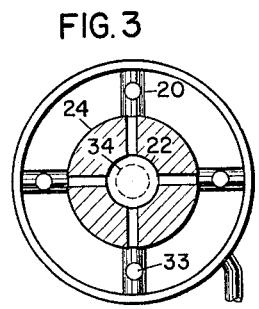
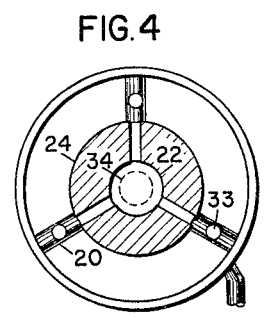
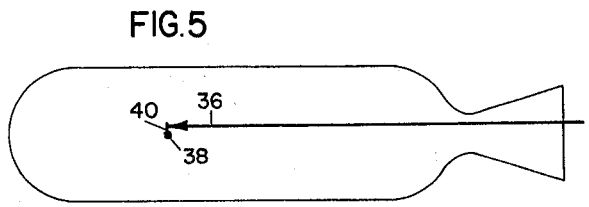
INVENTOR.
Verbon H. B. Wilhite
BY
Curtis, Morris & Safford
ATTORNEYS Sept. 20, 1966  V. H. B. WILHITE  3,273,801
ROCKET ACCELERATION AND DIRECTION CONTROL BY FLUID INJECTION
Filed Aug. 30, 1962  2 Sheets-Sheet 2
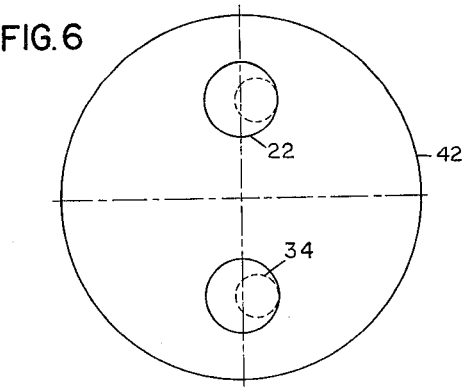
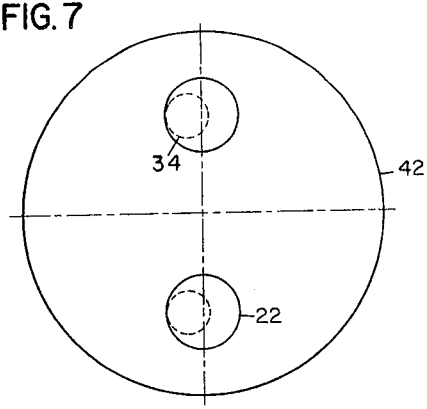
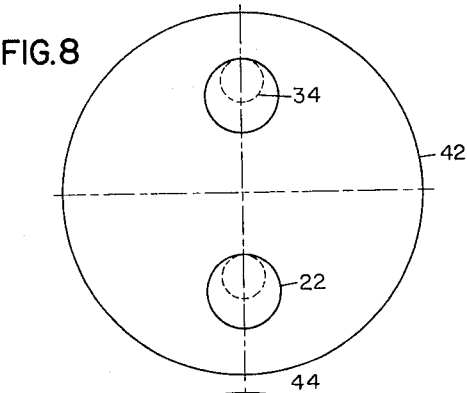
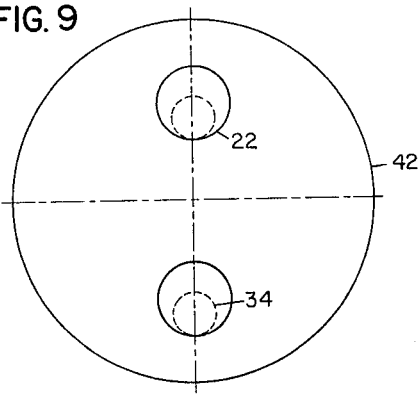
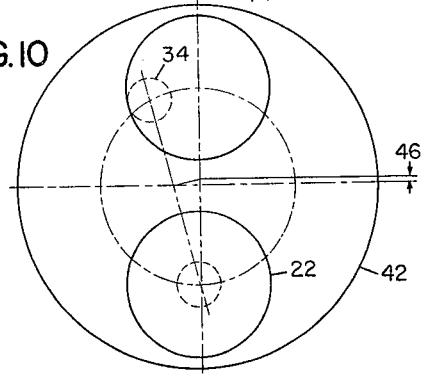
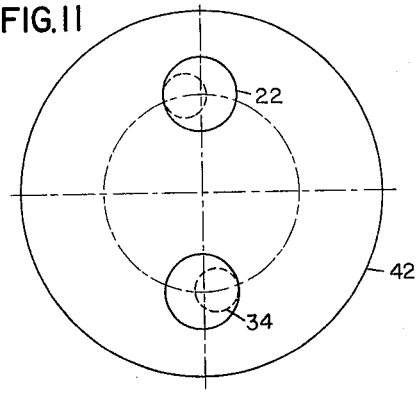
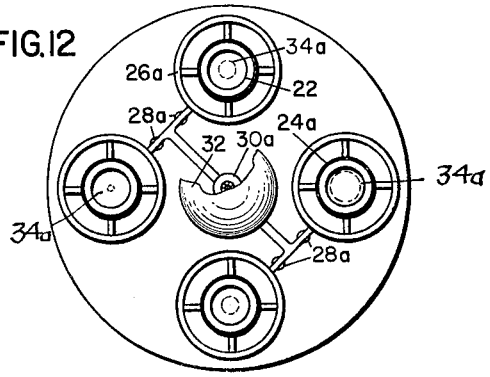
INVENTOR.
Verbon H. B. Wilhite
BY
Curtis, Morris & Safford
ATTORNEYS United States Patent Office 3,273,801
Patented Sept. 20, 1966

3,273,801
ROCKET ACCELERATION AND DIRECTION
CONTROL BY FLUID INJECTION
Verbon H. B. Wilhite, Brigham City, Utah, assignor to Thiokol Chemical Corporation, Bristol, Pa., a corporation of Delaware
Filed Aug. 30, 1962, Ser. No. 220,378
5 Claims. (Cl. 239—265.23)

This invention relates to systems for controlling the acceleration and direction of a rocket in flight and more particularly to devices for achieving such control by means of injecting fluids into the exhaust nozzle of the rocket.

Because of the high temperature and very erosive nature of the gases which are exhausted from a high performance rocket, especially a solid-propellant engine, new requirements are being imposed upon systems for controlling the flight of such a rocket. Conventional mechanisms for controlling the flight of a rocket including such devices as vernier rockets, movable nozzles, and "jetevators." Each of these control mechanisms is somewhat inadequate for its purpose in that it either has vital moving parts exposed to the erosive action of the exhaust gases of the rocket, imposes a considerable weight penalty upon the rocket, imparts aerodynamic drag to the missile, or is too complex to be reliable. My invention is directed to a system for creating a nonstructural, gaseous throat in a rocket nozzle by injecting a fluid against the exhaust gases passing therethrough. The control system of the present invention comprises a lightweight, compact mechanism having no moving parts exposed to the exhaust gases of the rocket. Hence, it circumvents the problems mentioned, and in addition, incorporates the features of improvement including among others (1) greater reliability, (2) decreased nozzle erosion, and (3) general protection of the nozzle from high temperatures by an inherent cooling action.

It is therefore an object of my invention to provide a rocket control system having no moving parts exposed to the erosive exhaust gases of the rocket.

Another object of my invention is to provide a rocket control system which is simpler, lighter, and more reliable than present systems.

Another object of my invention is to provide a rocket control system that will not increase frictional or pressure drag on the rocket during atmospheric flight.

Still another object of my invention is to provide a unitary rocket control system for individually or simultaneously controlling pitch, yaw, and roll of a rocket engine.

Another object of my invention is to provide a rocket control system by which the acceleration of the rocket can be controlled.

Another object of my invention is to provide a rocket control system which minimizes the erosion of the structural throat of the nozzle by the exhaust gases.

Still another object of the invention is to impart a cooling effect to the throat and exit cone of the nozzle of a rocket engine.

Other objects and advantages of my invention will become apparent as the following description is read with reference to the accompanying drawings, in which the same parts are designated by the same characters throughout the several views.

In the drawings:

FIGURE 1 is a perspective view of a rocket showing the nozzle arrangement preferred in practicing my invention.

FIGURE 2 is a sectional view of a nozzle throat taken on the line 2—2 of FIGURE 1.

FIGURE 3 is a transverse sectional veiw taken at the nozzle throat showing the preferred form of my invention using four ducts.

FIGURE 4 is a transverse sectional view taken at the nozzle throat showing my invention using three ducts.

FIGURE 5 is a diagram of a rocket illustrating how the lateral displacement of a thrust vector with respect to the center of mass of the rocket may effect a change in the direction of a rocket.

FIGURE 6 is a diagrammatic view in rear elevation of a rocket having two nozzles showing the displacement of the nonstructural throats to guide the rocket to the left.

FIGURE 7 is a view similar to FIGURE 6 except that it shows the displacement of the nonstructural throats to guide the rocket to the right.

FIGURE 8 is a view similar to FIGURE 6 except that it shows the displacement of the nonstructural throats to guide the rocket downwardly.

FIGURE 9 is a view similar to FIGURE 6 except that it shows the displacement of the nonstructural throats to guide the rocket upwardly.

FIGURE 10 is a view similar to FIGURE 6 except that it shows the effect of the displacement of the nonstructural throat while the other remains fixed, the circles representing the structural throats being greatly enlarged.

FIGURE 11 is a view similar to FIGURE 6 except that it shows displacement of the nonstructural throats to control the roll of the rocket.

FIGURE 12 is a rear elevation of a rocket having four nozzles showing an alternative method of guiding a rocket to the left.

As shown in FIGURE 1, the preferred form of my invention consists of a rocket engine comprising a tubular structure 12 closed at one end and having a propellant 14, an igniter 16, a combustion chamber 18, and two nozzles 24. Each of the nozzles 24 is provided with a plurality of ducts 20, see FIGURE 2, lying in a plane substantially perpendicular thereto, and extending radially outward from the surface of the throat 22. Ducts 20 are connected at one end to a manifold 26 and extend through the wall of its nozzle and each duct has an adjustable throttle valve 28 therein for modulating flow therethrough. Manifolds 26 are connected to each other and to a pump 30 which, in turn, is connected to supply tank 32 containing the fluid injectant by a suitable conduit means. Thus, the nozzles 24 have individual manifolds 26 connected in parallel to a common pump 30 and source of fluid 32, as shown in FIGURE 1. The throttle valves 28 may be individually controlled by remote means, not shown, which are well known in the art and the valves are actuated by motors 33. The source of fluid 32 may be the atmosphere in rockets intended strictly for atmospheric flights.

During powered flight of the rocket, a fluid from source 32 may be directed from manifold 26 through any selected duct or all of the ducts 20 simultaneously at a desired flow rate and pressure and substantially perpendicularly against the exhaust gases of the rocket at a point somewhat upstream from throat 22. This creates shock waves which form a gaseous, nonstructural throat 34 as illustrated in FIGURES 3 and 4 which is of the same shape but smaller in diameter than the structural throat 22 of the nozzle 24 when all of the ducts 20 are opened simultaneously.

When the injected gas is directed against the exhaust gases with equal force from all ducts 20 in a given nozzle, the nonstructural throat 34 will be concentric with the structural throat 22 as explained above. However, by controlling the relative force with which such fluid is directed against the exhaust gases of the rocket from each of the ducts 20, the non structural throat 34 can be located in any desired position within the confines of the structural throat 22. To do this, a minimum of three ducts 20 are required for each throat 22, as shown in FIGURE 4; and, for maximum effectiveness, they should be equally spaced about throat 22. However, if the system of ducts 20 is to be operated by remote control of throttle valves 28 by electrical signals from ground or airborne guidance equipment, a system of four ducts as shown in FIGURE 3, is simpler to operate and is, therefore, the preferred structure for my invention.

Pitch, yaw, and acceleration of a rocket can all be controlled within limits, by the system described in a rocket having only one nozzle. However, if the axial spin, or roll, of the rocket is also to be controlled without changing the flight direction of the rocket, at least two nozzles are probably required.

FIGURE 5 is a diagram of a rocket illustrating how a lateral displacement of the thrust vector 36 with respect to the center of mass 38 of the rocket creates a moment arm 40 which effects a change in the direction of the rocket about the center of mass 38. The torque force exerted about the center of mass 38 of the rocket is proportional to the moment arm or distance between the thrust vector and this center of mass. Such a displacement of the thrust vector can be effected by displacement of the nonstructural throat 34 with respect to the structural throat 22 of a nozzle by the method described.

FIGURES 6, 7, 8, 9, 10 and 11 are diagrammatic views, in rear elevation, of a rocket having two nozzles. Only the outer periphery 42 of the rocket, the structural throat 22 of the nozzle and the nonstructural throat 34 are represented in these figures. FIGURES 6 and 7 show how the nonstructural throats 34 of the two nozzles can be displaced from the center of the structural throat 22 to guide the rocket to the left and to the right, respectively. FIGURES 8 and 9 show how the nonstructural throats 34 can be displaced to guide the rocket downwardly or upwardly, respectively.

FIGURE 10 illustrates that motion of a rocket in a lateral direction, as shown in FIGURE 7 can also be accomplished by lateral displacement of only one of the nonstructural throats 34. However, this method may be undesirable in practice because of the introduction of the small component of force 46 in a direction perpendicular to the desired direction of motion.

FIGURE 11 illustrates the manner in which the nonstructural throats 34 can be displaced to control the axial spin of the rocket. Reference to FIGURES 5 and 11 will indicate that no change of direction of the rocket's flight will result if the nonstructural throats 34 are displaced simultaneously and in the same direction (clockwise or counterclockwise) along a circle whose center is the axis of the rocket and which passes through the centers of the structural throats 22. According to Newton's third law, such a simultaneous displacement of the nonstructural throats 34 will impart a torque to the rocket about its central axis and in a direction opposite to that of the displacement of the nonstructural throats 34. Also, the angular momentum imparted to the rocket by this torque will be proportional to the speed with which the nonstructural throats 34 are displaced. Hence, if a rocket in flight is spinning about its axis and if the angular velocity of this spin is known, the speed of displacement of the nonstructural throats 34 can be regulated to impart an equal angular momentum to the rocket in a direction opposite to that of its spin.

Furthermore, the flow of a relatively cool fluid adjacent the inside surface of the nozzle prevents contact by the hot exhaust gases which reduces erosion of the nozzle throat. By injecting a limited quantity of control fluid from all four ducts 20 simultaneously a thin cool layer of control fluid may be provided between the exhaust gas and nozzle surface to protect the latter.

It may also be observed that, in addition to its utility as a steering mechanism for a rocket as explained above, my invention may also be used, within limits, to control the acceleration of a rocket. This is because of the fact that the diameter of the nonstructural throat 34 may be varied according to the force exerted upon it by the gas from ducts 20 and because there is a relationship between the throat diameter and the thrust in a given rocket engine.

This phenomenon not only permits speed control of a rocket, but it also makes possible the alternative embodiment of the invention, illustrated in FIGURE 12, which constitutes a steering mechanism operating on a different principle from that previously described. In this embodiment, the rocket must have at least three nozzles 24a, but preferably four as shown. Structurally, the invention as applied to each nozzle means may be identical to that described previously, except that only one valve 28a is required for each nozzle 24a. This valve 28a is located in the tube between each manifold 26a and the pump 30a. Using this form of the invention, steering may be effected by varying the sizes of selected nonstructural throats 34a. With the nonstructural throats controlled as shown in FIGURE 12, the rocket should turn to the left, since a greater mass flow, and, hence, greater thrust, is occurring at the right-hand side of the rocket. Such an imbalance of forces exerted upon the moment arms 40 which extend from the thrust vectors through the nozzles to the center of mass 38 of the rocket will cause the rocket to turn about the center of mass in the direction of weakest thrust vector.

My invention may also be used for empirical determination of the optimum size for a structural throat of a given rocket engine that is not to be equipped with this invention. This can be done by passing a gas, such as air, through a nozzle equipped with the invention; the pressure of this gas being equal to that of the exhaust gases of the rocket engine under consideration. The injectant gas may be colored and the resulting nonstructural, gaseous throat photographed and measured through a transparent portion of the structural throat.

Having described how a nonstructural, gaseous throat may be created in a rocket-engine nozzle and how the flexibility and mobility of such a throat within a rigid structure may be used advantageously to control the speed and direction of a rocket, it is also appropriate to note that the structure described could include many alternatives without departing from the spirit and scope of the invention. For example, the fluid preferred for injecting against the exhaust gases of the rocket engine to create the nonstructural throat described is an inert gas, such as helium or Freon (a fluorinated hydrocarbon). However, it is possible that an inert liquid or a reactive gas or liquid could also be used. Also, variable-speed pumps may make the valves 28 unnecessary.

I claim:

1. A control for a rocket engine having a vessel closed at its forward end and having a plurality of nozzles at its opposite end located in equally spaced relation to each other around a central axis and at equal distances from the axis, a propellant in said vessel, each of said nozzles having a throat through which the combustion products of said propellant pass, and means for each nozzle for producing a nonstructural throat therein and at different areas of the throat of the nozzle comprising a plurality of spaced ducts leading into said structural throat in a plane located between the smallest diameter of said nozzle throat and a place upstream therefrom, a source of noncombustible fluid, means for delivering fluid from said source to the ducts in the throats of said nozzles to impinge the exhaust gases passing therethrough, and an adjustable valve in each of the ducts in each of said nozzles for varying the rate of flow therethrough from zero to maximum rate whereby to produce nonstructural throats eccentric to the structural throats in said plurality of nozzles and produce nonstructural throats concentric with the structural throats in said plurality of nozzles.

2. A control for a rocket engine in accordance with claim 1 in which a manifold surrounds each nozzle, the ducts for each nozzle being connected to the manifold, conduit means connecting the source of pressure to the manifolds, and the means for delivering fluid to the ducts in each of said throats comprising a pump in said conduit means for delivering the fluid under pressure.

3. A control for a rocket engine in accordance with claim 1 in which the valve means in the individual ducts for the plurality of nozzles are individually adjustable to produce eccentric nonstructural throats at different areas of the structural throats of the plurality of nozzles to change the direction and rotational force acting on the rocket engine, and produce concentric nonstructural throats of the same or different sizes in the plurality of nozzles.

4. A control for a rocket engine in accordance with claim 1 in which at least two of the equally spaced nozzles are arranged parallel to and at diametrically opposite sides of the central axis, the adjustable valve in the individual ducts for the plurality of nozzles are adjustable to produce concentric nonstructural throats of different areas in the nozzles at opposite sides of the central axis to control the direction of the rocket engine.

5. The method of controlling a rocket engine having a central axis and nozzles in parallel arrangement at diametrically opposite sides of the axis through which combustion products pass which comprises injecting fluid into the nozzles to form an annulus of fluid between the escaping gases and nozzle walls to produce a nonstructural throat concentric with the structural throat, varying the rate of flow of fluid to the separate nozzles from zero to maximum rate to produce nonstructural throats of different areas in nozzles at diametrically opposite sides of the central axis to control the direction of the rocket engine; and varying the rate of flow to the nozzles to produce nonstructural throats of different but equal areas in the nozzles at opposite sides of the central axis to vary the acceleration of the rocket engine.

References Cited by the Examiner

UNITED STATES PATENTS

| | | | |
|---|---|---|---|
| 2,763,984 | 9/1956 | Kadosch et al. | 60—35.6 |
| 2,934,896 | 5/1960 | Kadosch et al. | 60—35.54 |
| 2,943,821 | 7/1960 | Wetherbee | 60—35.6 X |
| 2,952,123 | 9/1960 | Rich | 60—35.54 |
| 3,015,210 | 1/1962 | Williamson et al. | 60—35.54 |
| 3,030,769 | 4/1962 | Badders | 60—35.6 |
| 3,036,430 | 5/1962 | Eggers et al. | 60—35.54 |
| 3,050,938 | 8/1962 | Twyford | 60—35.55 |
| 3,070,957 | 1/1963 | McCorkle | 60—35.6 X |
| 3,079,753 | 3/1963 | Gongwer | 60—35.6 |
| 3,134,225 | 5/1964 | Pennington | 60—35.54 |

MARK NEWMAN, *Primary Examiner.*

ABRAM BLUM, *Examiner.*

W. A. SCHUETZ, A. L. SMITH, *Assistant Examiners.*